(12) United States Patent
Davis et al.

(10) Patent No.: US 11,578,739 B2
(45) Date of Patent: Feb. 14, 2023

(54) FURNITURE WITH INTERWOVEN TAB AND SLOT JOINT

(71) Applicant: Clark Davis, Genola, UT (US)

(72) Inventors: Clark Davis, Provo, UT (US); Paul Schmidt, Provo, UT (US)

( * ) Notice: Subject to any disclaimer, the term of this patent is extended or adjusted under 35 U.S.C. 154(b) by 1169 days.

(21) Appl. No.: 16/151,808

(22) Filed: Oct. 4, 2018

(65) Prior Publication Data
US 2019/0107131 A1 Apr. 11, 2019

Related U.S. Application Data

(60) Provisional application No. 62/568,415, filed on Oct. 5, 2017.

(51) Int. Cl.
| | |
|---|---|
| *F16B 5/00* | (2006.01) |
| *A47B 47/00* | (2006.01) |
| *B65D 25/30* | (2006.01) |
| *B65D 6/02* | (2006.01) |
| *B65D 6/34* | (2006.01) |
| *F16M 11/24* | (2006.01) |
| *F16B 12/46* | (2006.01) |

(52) U.S. Cl.
CPC ........ *F16B 5/0032* (2013.01); *A47B 47/0075* (2013.01); *B65D 9/06* (2013.01); *B65D 9/34* (2013.01); *B65D 25/30* (2013.01); *F16M 11/24* (2013.01); *A47B 2230/0081* (2013.01); *A47B 2230/0096* (2013.01); *F16B 2012/463* (2013.01)

(58) Field of Classification Search
CPC ............. F16B 5/0032; F16B 2012/463; A47B 47/0075; A47B 2230/0081; A47B 2230/0096; B65D 9/06; B65D 9/34

USPC .................................. 108/180, 165, 157.14
See application file for complete search history.

(56) References Cited

U.S. PATENT DOCUMENTS

| | | | |
|---|---|---|---|
| 456,353 | A | 7/1891 | Bower |
| 919,257 | A | 4/1909 | Seydewitz |
| 981,532 | A | 1/1911 | Cary |
| 1,061,297 | A | 5/1913 | Johnson |
| 1,419,647 | A | 6/1922 | Shepherdson |
| 1,431,823 | A | 10/1922 | Georges |

(Continued)

FOREIGN PATENT DOCUMENTS

| | | |
|---|---|---|
| CA | 1255355 | 6/1989 |
| CH | 281702 | 3/1952 |

(Continued)

OTHER PUBLICATIONS

Celery Rocking Chair viewed at http://www.eroomservice.com/manufacturer/celery/ circa Dec. 3, 2011.

(Continued)

*Primary Examiner* — Jose V Chen
(74) *Attorney, Agent, or Firm* — Peterson IP; Brett Peterson

(57) ABSTRACT

A joint for furniture uses alternating tabs and slots formed along an edge of first and second furniture panels. The panels are joined together so that tabs in the first panel are disposed in slots in the second panel and tabs in the second panel are disposed in slots in the first panel. This arrangement causes the slots to flex outwardly and the tabs to flex inwardly once assembled and creates residual stress in the assembled joint which stiffens the joint.

18 Claims, 14 Drawing Sheets

(56) References Cited

U.S. PATENT DOCUMENTS

| | | | |
|---|---|---|---|
| 1,747,900 A | 2/1930 | Jenny | |
| 1,903,631 A | 4/1933 | Morrison | |
| 1,940,117 A | 12/1933 | Carpos | |
| 1,981,646 A | 11/1934 | Hamley | |
| 2,240,256 A | 4/1941 | Elmendorf | |
| 2,279,864 A | 4/1942 | Eide | |
| 2,334,912 A | 11/1943 | Eide | |
| 2,369,930 A | 2/1945 | Wagner | |
| D144,730 S | 5/1946 | Perrault | |
| 2,418,731 A | 4/1947 | Seitz | |
| 2,479,086 A | 8/1949 | Silverman | |
| 2,481,671 A | 9/1949 | John et al. | |
| 2,486,987 A | 11/1949 | Scarlett | |
| 2,518,955 A | 8/1950 | Stelzer | |
| 2,534,413 A | 12/1950 | Cenis | |
| 2,551,071 A | 5/1951 | Tynes | |
| D164,552 S | 9/1951 | Curtis | |
| 2,595,002 A | 4/1952 | Schneider | |
| 2,602,012 A | 7/1952 | Doty | |
| 2,615,771 A | 10/1952 | Curtis | |
| 2,632,498 A | 3/1953 | Curtis | |
| 2,672,181 A | 3/1954 | Rose | |
| 2,677,491 A | 5/1954 | Burger | |
| 2,703,724 A | 3/1955 | Der Yuen | |
| 2,720,253 A | 10/1955 | Turner | |
| 2,745,591 A | 5/1956 | Holt | |
| 2,786,789 A | 3/1957 | Carlson | |
| 2,792,877 A | 5/1957 | West | |
| 2,801,895 A | 8/1957 | Gass | |
| 2,825,101 A | 3/1958 | Rubsnstein | |
| 2,908,400 A * | 10/1959 | Richter | A47F 5/116 |
| | | | 108/180 |
| 3,053,598 A | 9/1962 | Cheslow | |
| 3,069,216 A * | 12/1962 | Vaeth | A47B 47/042 |
| | | | 312/265.5 |
| 3,089,675 A | 5/1963 | Lozier | |
| 3,149,880 A | 9/1964 | Steuer | |
| 3,186,027 A | 6/1965 | Merillat | |
| 3,262,405 A | 7/1966 | Sutton | |
| 3,300,170 A | 1/1967 | Charles | |
| 3,300,245 A | 1/1967 | Rumble | |
| D212,601 S | 11/1968 | Rubsnstein | |
| 3,410,441 A * | 11/1968 | Rhyne | A47B 88/941 |
| | | | 312/263 |
| 3,527,497 A | 9/1970 | Self | |
| 3,547,491 A | 12/1970 | Bovasso | |
| 3,578,385 A | 5/1971 | Stiglitz | |
| 3,599,822 A * | 8/1971 | Johnson | B65D 9/12 |
| | | | 217/65 |
| 3,603,274 A | 9/1971 | Ferdinand | |
| 3,603,656 A | 9/1971 | Ferman | |
| 3,636,893 A | 1/1972 | Lange | |
| 3,674,328 A | 7/1972 | White et al. | |
| 3,684,285 A | 8/1972 | Kane | |
| 3,692,201 A * | 9/1972 | Garduna | B65D 9/34 |
| | | | 217/65 |
| 3,697,363 A | 10/1972 | Martinez | |
| 3,783,801 A | 1/1974 | Engman | |
| 3,788,700 A | 1/1974 | Wartes | |
| 3,812,977 A | 5/1974 | Glassman | |
| 3,831,533 A | 8/1974 | Kellogg | |
| 3,847,435 A | 11/1974 | Skinner | |
| 4,021,128 A | 5/1977 | Chiames | |
| 4,055,924 A | 11/1977 | Beaver | |
| D247,596 S | 3/1978 | Osamu | |
| 4,082,356 A | 4/1978 | Johnson | |
| 4,099,472 A | 7/1978 | Kellogg | |
| 4,103,818 A | 8/1978 | Raubenheimer | |
| 4,140,065 A | 2/1979 | Chacon | |
| 4,153,311 A | 5/1979 | Takhasaki | |
| 4,158,277 A | 6/1979 | Krempp et al. | |
| 4,188,067 A | 2/1980 | Elmer | |
| 4,191,113 A | 3/1980 | Hogberg | |
| 4,202,581 A | 5/1980 | Fleishman | |
| 4,225,180 A | 9/1980 | Gillis | |
| 4,258,464 A | 3/1981 | Ullman | |
| 4,348,052 A | 9/1982 | Roland | |
| 4,358,047 A * | 11/1982 | Raubenheimer | B65D 5/48038 |
| | | | 229/120.36 |
| 4,390,204 A | 6/1983 | Fleishman | |
| 4,419,028 A | 12/1983 | Roland | |
| 4,433,753 A | 2/1984 | Watson | |
| 4,433,843 A | 2/1984 | Bricco | |
| 4,492,332 A | 1/1985 | Collins | |
| 4,501,512 A | 2/1985 | Hiltz | |
| 4,509,794 A | 4/1985 | Roland | |
| 4,533,174 A | 8/1985 | Fleishman | |
| 4,544,092 A | 10/1985 | Palmer | |
| 4,548,350 A | 10/1985 | Engle | |
| 4,574,917 A | 3/1986 | Stoddard | |
| 4,591,090 A | 5/1986 | Collins | |
| 4,593,950 A | 6/1986 | Vittorio | |
| 4,595,105 A | 6/1986 | Gold | |
| D289,234 S | 4/1987 | Hoult | |
| 4,685,609 A | 8/1987 | Ferrari | |
| 4,706,573 A | 11/1987 | Sielaff | |
| 4,712,837 A | 12/1987 | Swilley | |
| 4,759,449 A | 7/1988 | Gold | |
| D299,087 S | 12/1988 | Bruce | |
| 4,841,878 A | 6/1989 | Kriegsman | |
| D302,216 S | 7/1989 | Roland | |
| 4,846,530 A | 7/1989 | Noble | |
| 4,867,327 A | 9/1989 | Roland | |
| 4,878,439 A | 11/1989 | Samson | |
| 4,884,420 A | 12/1989 | Finkel | |
| 4,926,759 A | 5/1990 | Vitsky et al. | |
| 4,930,753 A * | 6/1990 | Alvyn | F16B 5/0048 |
| | | | 403/339 |
| 4,934,765 A | 6/1990 | Slifer | |
| 5,011,228 A | 4/1991 | Marcantel | |
| 5,069,144 A | 12/1991 | Williford | |
| 5,082,329 A | 1/1992 | Mars | |
| 5,253,594 A | 10/1993 | Sideris | |
| 5,253,595 A | 10/1993 | Heidmann | |
| 5,263,766 A | 11/1993 | McCullough | |
| 5,275,467 A | 1/1994 | Kawecki | |
| 5,343,816 A | 9/1994 | Sideris | |
| 5,354,589 A | 10/1994 | Waas | |
| 5,367,964 A | 11/1994 | Hockensmith | |
| 5,387,027 A | 2/1995 | Maloney | |
| 5,454,331 A | 10/1995 | Green | |
| 5,605,378 A | 2/1997 | Oyediran | |
| 5,613,449 A | 3/1997 | Pullman | |
| 5,644,995 A | 7/1997 | Gurwell et al. | |
| 5,655,812 A | 8/1997 | Albecker | |
| 5,706,741 A | 1/1998 | Thorp | |
| 5,720,537 A | 2/1998 | Lutz | |
| 5,752,611 A | 5/1998 | Nakagawa | |
| 5,765,922 A | 6/1998 | Hsia | |
| 5,803,548 A | 9/1998 | Battle | |
| 5,803,561 A | 9/1998 | Puehlhorn | |
| 5,881,653 A | 3/1999 | Pfister | |
| 5,901,521 A | 5/1999 | Guy | |
| 5,921,631 A | 7/1999 | Bush | |
| 5,927,816 A | 7/1999 | Hsu | |
| 5,941,377 A | 8/1999 | Hart | |
| 5,992,938 A | 11/1999 | Jones | |
| 6,029,584 A | 2/2000 | Cochrane | |
| 6,036,270 A | 3/2000 | Bufalini | |
| 6,041,920 A | 3/2000 | Hart | |
| D422,799 S | 4/2000 | Dworshak et al. | |
| 6,053,585 A | 4/2000 | Osen | |
| 6,109,695 A | 8/2000 | Kahwaji | |
| 6,126,022 A | 10/2000 | Merkel | |
| 6,155,641 A | 12/2000 | Frost | |
| 6,174,116 B1 | 1/2001 | Brand | |
| 6,189,974 B1 | 2/2001 | Beck | |
| 6,247,754 B1 | 6/2001 | Vanderaue et al. | |
| 6,283,564 B1 | 9/2001 | Corson | |
| 6,347,772 B1 | 2/2002 | L'Hotel | |
| 6,357,194 B1 * | 3/2002 | Jones, Jr. | F16B 12/125 |
| | | | 52/592.1 |
| 6,378,707 B1 | 4/2002 | Taggert | |

(56) References Cited

U.S. PATENT DOCUMENTS

| | | |
|---|---|---|
| 6,443,076 B1 | 9/2002 | Case |
| 6,453,973 B1 * | 9/2002 | Russo ................. A47F 5/11 |
| | | 52/592.1 |
| 6,532,878 B2 | 3/2003 | Tidemann |
| 6,595,378 B2 | 7/2003 | Wang |
| 6,615,746 B2 | 9/2003 | Bart |
| 6,615,999 B1 | 9/2003 | Culp |
| 6,619,749 B2 | 9/2003 | Willy |
| 6,675,979 B2 | 1/2004 | Taylor |
| 6,769,369 B1 | 8/2004 | Brandenberg |
| 6,807,912 B2 | 10/2004 | Willy |
| D499,577 S | 12/2004 | Willy |
| 6,845,871 B1 | 1/2005 | Culp |
| 6,848,747 B1 | 2/2005 | Robinson |
| RE38,707 E * | 3/2005 | Merkel ................. F16B 12/24 |
| | | 211/186 |
| 6,895,870 B1 | 5/2005 | Bizlewicz |
| 6,955,401 B1 | 10/2005 | Shoulberg |
| 6,994,222 B2 | 2/2006 | Hunt |
| 7,066,548 B2 | 6/2006 | Butler |
| 7,114,300 B1 | 10/2006 | Culp |
| 7,168,766 B2 | 1/2007 | Pelletier |
| 7,219,962 B2 | 5/2007 | Stone |
| D547,076 S | 7/2007 | Hughes et al. |
| 7,255,403 B2 | 8/2007 | Butler |
| 7,300,110 B1 | 11/2007 | Debien |
| 7,386,960 B2 | 6/2008 | Molteni |
| 7,533,940 B1 | 5/2009 | Zook |
| 7,631,605 B2 | 12/2009 | Willy |
| 7,765,942 B2 | 8/2010 | Choi |
| 7,856,772 B1 | 12/2010 | Culp et al. |
| 8,123,311 B2 | 2/2012 | Nilsson |
| 8,167,377 B2 | 5/2012 | Kovach |
| 8,215,245 B2 | 7/2012 | Morrison |
| 8,220,399 B2 | 7/2012 | Berent et al. |
| 8,332,917 B2 | 12/2012 | Forster |
| 8,459,476 B2 | 6/2013 | Malekmadani |
| 8,590,976 B2 | 11/2013 | Davis |
| 8,651,298 B2 | 2/2014 | Beaty |
| 8,667,911 B2 | 3/2014 | Brandenberg |
| 9,220,994 B2 | 12/2015 | Murphy |
| 9,277,814 B2 | 3/2016 | Winker |
| 9,282,819 B2 | 3/2016 | Blake |
| 9,447,804 B2 | 9/2016 | Andersson |
| 9,534,623 B2 | 1/2017 | Anderson et al. |
| 9,615,663 B2 | 4/2017 | Davis |
| 9,668,573 B2 | 6/2017 | Salani |
| 9,706,836 B1 | 7/2017 | Nelson |
| 9,719,542 B2 | 8/2017 | Cappelle |
| 10,138,917 B2 | 11/2018 | Koch |
| 10,227,162 B2 | 3/2019 | Davis |
| 10,660,433 B1 | 5/2020 | Jomaa |
| 2003/0107255 A1 | 6/2003 | Willy |
| 2004/0056526 A1 | 3/2004 | Willy |
| 2004/0227041 A1 | 11/2004 | Lewis |
| 2007/0169429 A1 | 7/2007 | Wu |
| 2007/0187348 A1 | 8/2007 | Malekmadani |
| 2008/0074013 A1 | 3/2008 | Ahlgrim et al. |
| 2008/0302748 A1 | 12/2008 | Tsai |
| 2009/0066140 A1 | 3/2009 | Berent et al. |
| 2009/0084740 A1 | 4/2009 | Lin |
| 2010/0003077 A1 | 1/2010 | Kelley |
| 2012/0080910 A1 | 4/2012 | Davis |
| 2013/0062294 A1 | 3/2013 | Beaty |
| 2013/0080286 A1 | 3/2013 | Rotholz |
| 2013/0170904 A1 | 7/2013 | Cappelle |
| 2014/0048176 A1 | 2/2014 | Susnjara |
| 2014/0048177 A1 | 2/2014 | Susnjara |
| 2014/0059829 A1 | 3/2014 | Weber |
| 2014/0186104 A1 | 7/2014 | Hamberger |
| 2014/0263130 A1 | 9/2014 | Davis |
| 2015/0144578 A1 * | 5/2015 | Maiden ................. A47B 47/025 |
| | | 211/26 |
| 2015/0173989 A1 * | 6/2015 | Mitchell ................. B65D 9/12 |
| | | 220/4.28 |
| 2015/0183177 A1 * | 7/2015 | Blay Orenga ........ B31B 50/064 |
| | | 493/137 |
| 2015/0230600 A1 | 8/2015 | Schulte |
| 2015/0335155 A1 | 11/2015 | Winker |
| 2017/0023043 A1 | 1/2017 | Koelling et al. |
| 2017/0340107 A1 | 1/2017 | Shen |
| 2017/0058926 A1 * | 3/2017 | Takubo ................. A63H 33/084 |
| 2017/0079426 A1 * | 3/2017 | Davis ................. B65D 21/0212 |
| 2017/0086578 A1 | 3/2017 | Nowak |
| 2017/0099961 A1 | 4/2017 | Church |
| 2017/0265650 A1 | 9/2017 | Adair |
| 2018/0112696 A1 | 4/2018 | Davis |
| 2019/0038023 A1 | 2/2019 | Stocker |
| 2019/0040890 A1 * | 2/2019 | Davis ..................... F16B 12/00 |
| 2019/0059593 A1 | 2/2019 | Davis |
| 2019/0059594 A1 | 2/2019 | Davis |
| 2019/0085886 A1 | 3/2019 | Davis |
| 2019/0107131 A1 | 4/2019 | Davis |
| 2019/0254424 A1 | 8/2019 | Rassat |
| 2020/0370585 A1 | 11/2020 | Huang |

FOREIGN PATENT DOCUMENTS

| | | |
|---|---|---|
| DE | 1529719 | 5/1969 |
| DE | 2100168 | 11/1972 |
| DE | 3925302 | 2/1991 |
| DE | 9201692 | 4/1992 |
| DE | 29914896 | 12/1999 |
| DE | 29906711 | 1/2000 |
| DE | 102007058662 | 6/2009 |
| DE | 102014006155 | 10/2014 |
| EP | 0299695 | 1/1989 |
| FR | 1300853 | 8/1962 |
| FR | 2634991 | 2/1990 |
| FR | 2654164 | 5/1991 |
| GB | 143840 | 12/1920 |
| GB | 810752 | 3/1959 |
| GB | 2353080 | 2/2001 |
| NL | 1025719 | 9/2005 |
| WO | WO 2005-085656 | 9/2005 |

OTHER PUBLICATIONS

PlyGrid Shelves viewed at http://offi.com/products/offikids/PLYGRID.php?p2c=249 circa Dec. 3, 2011.
Snap Table viewed at http://www.offi.com/pdfs/snaptable.pdf circa Dec. 3, 2011.
Furniture viewed at http://www.playatech.com/product_list.php circa Dec. 3, 2011.
Arabic Table viewed at http://www.plydea.com/support/assemblypdf.html circa Dec. 3, 2011.
Blue7Chair viewed at http://www.plydea.com/support/assemblypdf.html circa Dec. 3, 2011.
First Desk viewed at http://www.plydea.com/support/assemblypdf.html circa Dec. 3, 2011.
Rinaldo Chair viewed at http://www.plydea.com/support/assemblypdf.html circa Dec. 3, 2011.
Tuffet Stool viewed at http://www.plydea.com/support/assemblypdf.html circa Dec. 3, 2011.
WasteNot Basket viewed at http://www.plydea.com/support/assemblypdf.html circa Dec. 3, 2011.
Winehold Wine Rack viewed at http://www.plydea.com/support/assemblypdf.html circa Dec. 3, 2011.

* cited by examiner

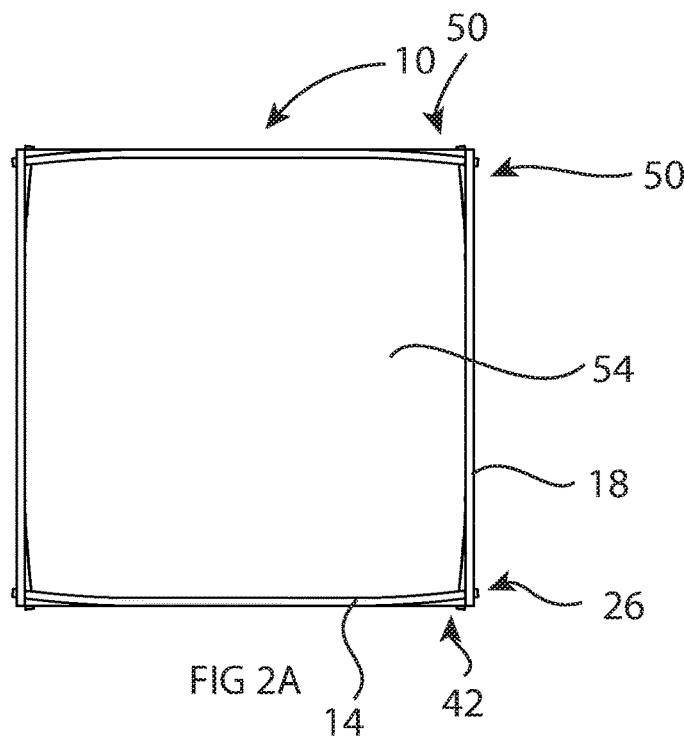
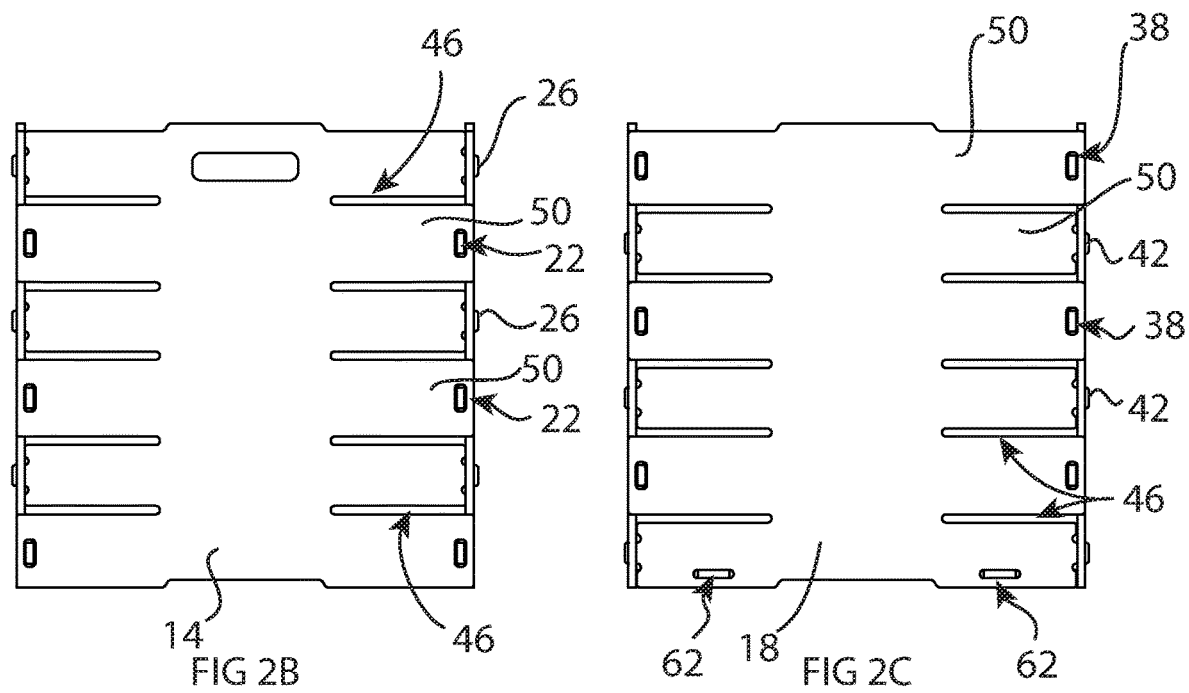

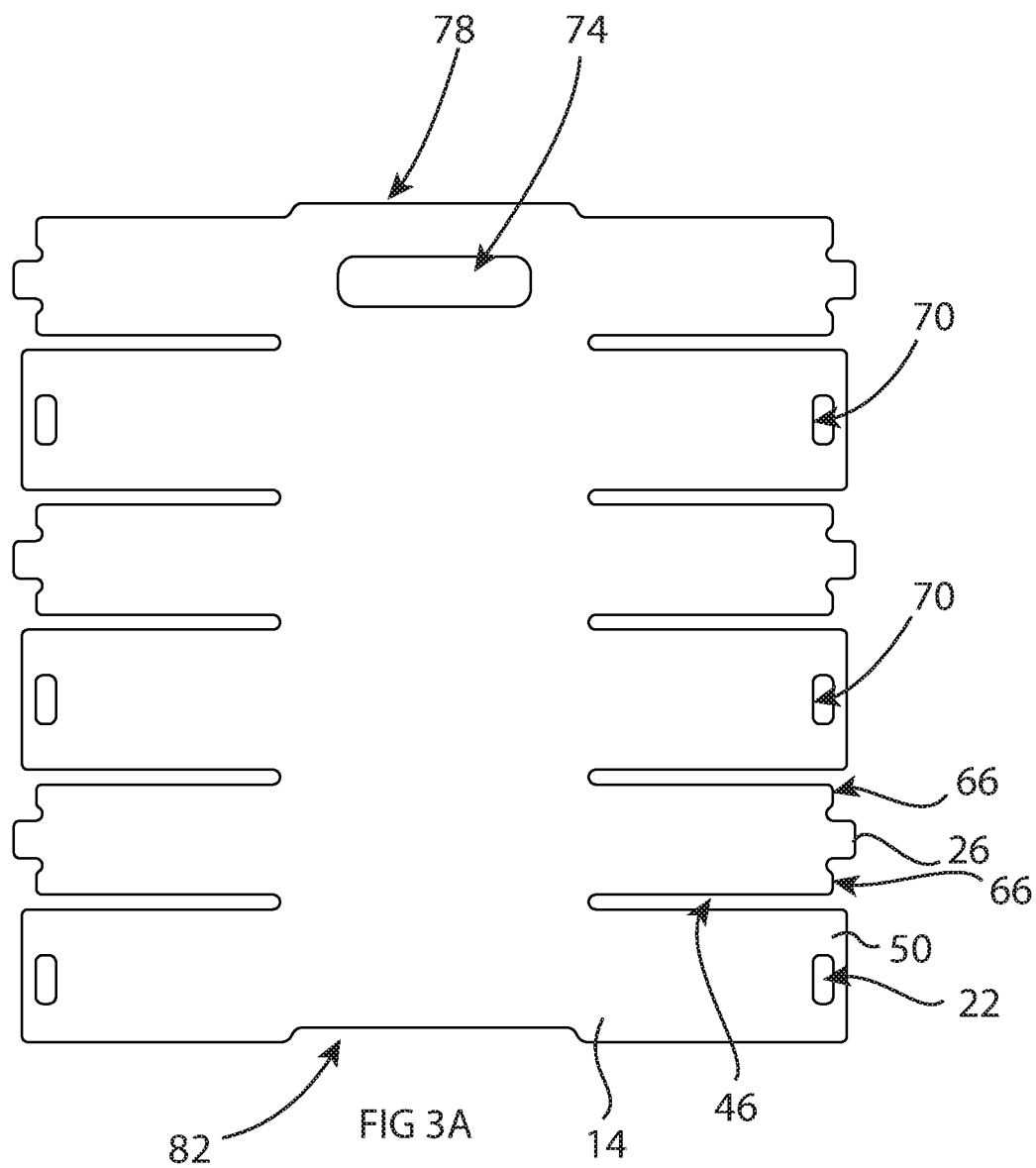
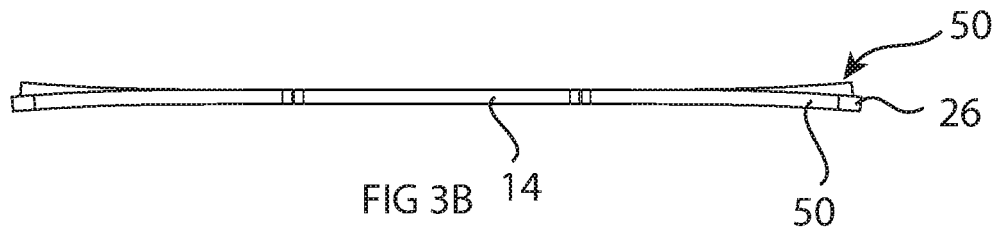

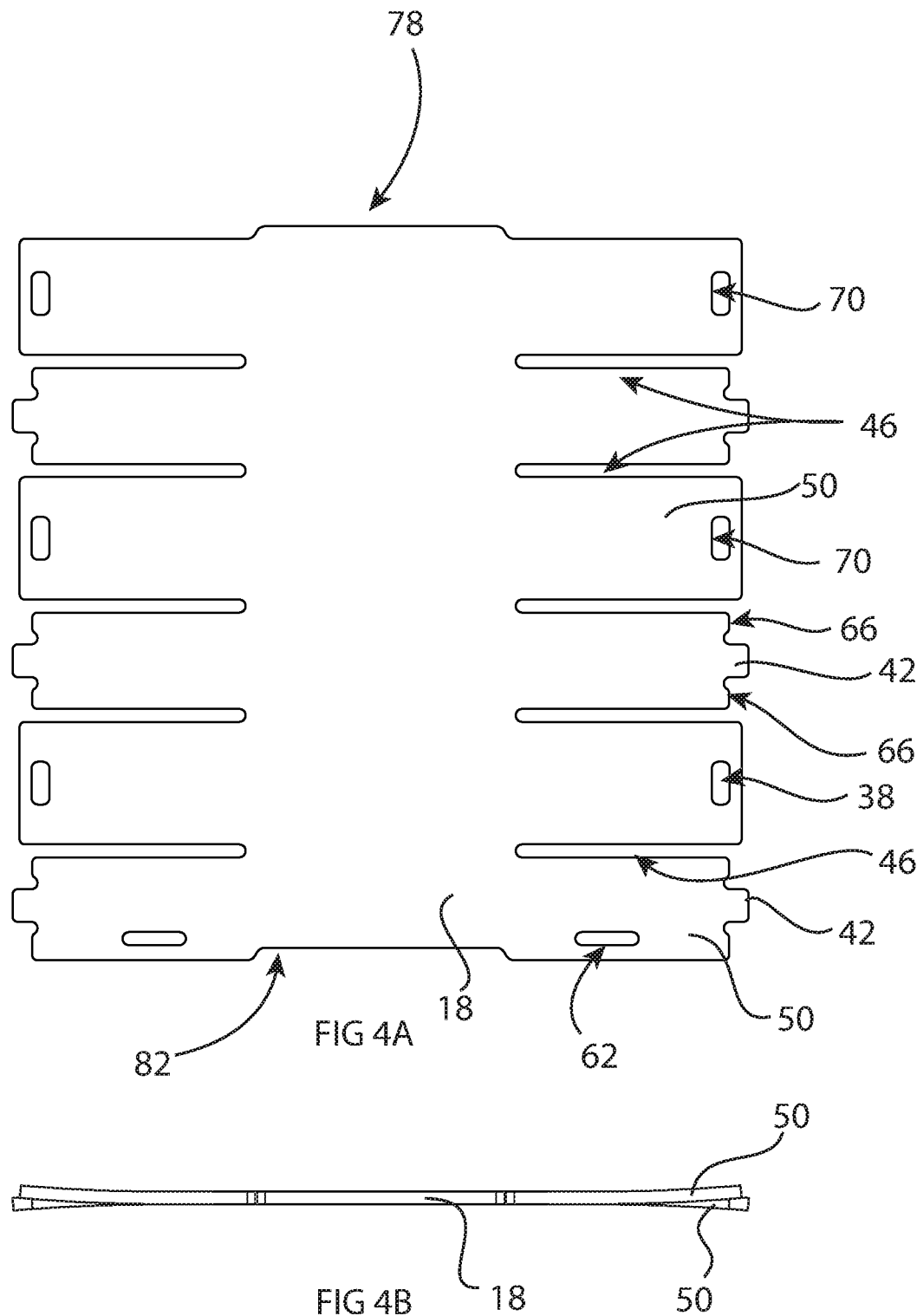

FURNITURE WITH INTERWOVEN TAB AND SLOT JOINT

PRIORITY

The present application claims the benefit of U.S. Provisional Application Ser. No. 62/568,415, filed Oct. 5, 2017, which is herein incorporated by reference in its entirety.

THE FIELD OF THE INVENTION

The present invention relates to furniture. In particular, examples of the present invention relate to a modular furniture joint which allows for tool-less assembly and increased stability.

BACKGROUND

Many persons desire modular furniture. Modular furniture is often assembled by the end user from flat pieces and is thus easy to store and transport in the un-assembled form. Modular furniture often suffers from instability, and in some instances modular furniture is made overly complex or uses more permanent fastening or construction methods to stabilize the furniture. This, however, makes the furniture more cumbersome for the end user and reduces some of the portability and ease of use associated with this type of furniture. Additionally, the use of fasteners such as screws or nails to stabilize the furniture is often problematic in the long term as these fasteners become loose with use and movement of the furniture.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

FIG. 2A shows a top view of the crate of FIG. 1.

FIG. 2B shows a front view of the crate of FIG. 1.

FIG. 2C shows a side view of the crate of FIG. 1.

FIG. 3A shows a front view of the first panel of the crate of FIG. 1.

FIG. 3B shows a top view of the first panel of the crate of FIG. 1.

FIG. 4A shows a front view of the second panel of the crate of FIG. 1.

FIG. 4B shows a top view of the second panel of the crate of FIG. 1.

Figure 1:
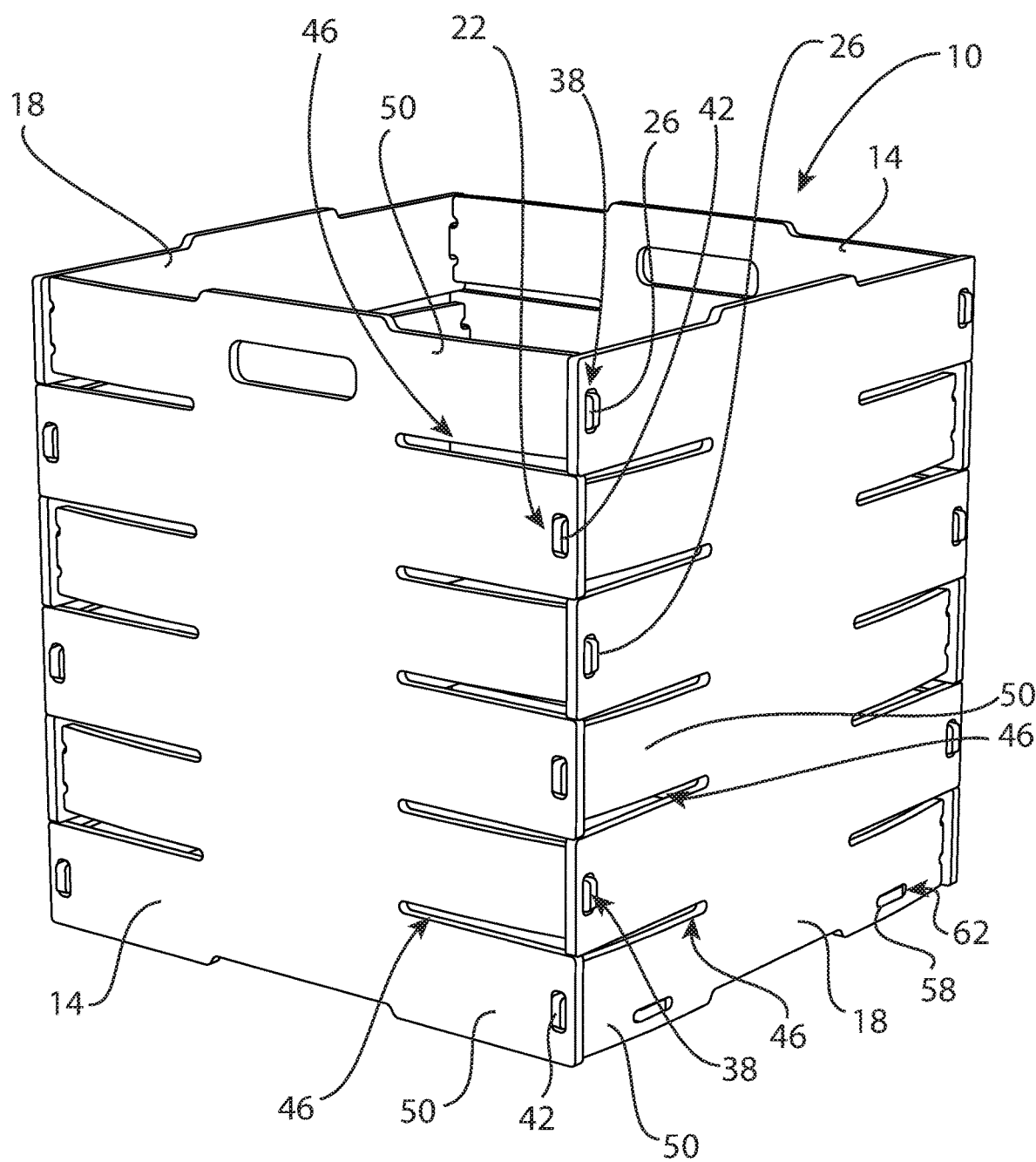
FIG. 1 shows a perspective view of a crate according to the present invention.

Corresponding reference characters indicate corresponding components throughout the several views of the drawings. Unless otherwise noted, the drawings have been drawn to scale to facilitate understanding of the invention. Skilled artisans will appreciate that elements in the figures are illustrated for simplicity and clarity. For example, the dimensions of some of the elements in the figures may be exaggerated relative to other elements or figures to help to improve understanding of various examples of the present invention. Also, common but well-understood elements that are useful or necessary in a commercially feasible embodiment are often not depicted in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described. The particular features, structures or characteristics may be combined in any suitable combination and/or sub-combinations in one or more embodiments or examples. It is appreciated that the figures provided herewith are for explanation purposes to persons ordinarily skilled in the art.

The disclosure describes how an article of furniture may be constructed using one or more joints between adjacent furniture panels which include interlocking tabs and slots. The tabs and slots are arranged so that multiple tabs and slots are formed on first and second panels of a furniture joint. The first panel and the second panel each have both tabs and slots which engage corresponding tabs or slots on the other panel and flex to allow all of the tabs to engage the corresponding slot. The tabs and slots may be formed on fingers which are part of the first panel and second panel. The panels may be cut inwardly from the joint edge to form fingers, and the tabs and slots may be formed near the ends of the fingers. The use of fingers increases the flexibility of the panels and the ease of assembling the resulting article of furniture.

FIG. 1 shows a perspective view of a storage crate 10 with a woven tab and slot joint. FIG. 2A shows a top view of the storage crate 10. FIG. 2B shows a front view of the storage crate 10. FIG. 2C shows a side view of the storage crate 10. This type of construction may be used to create different sizes and styles of crates, boxes, baskets, drawers, etc. The woven tab and slot joint may also be used to make other different pieces of furniture. The woven tab or slot joint may be used in creating a furniture cabinet or stand, etc. The storage crate uses four woven tab and slot joints between the four side panels of the crate. For clarity in discussing the woven tab and slot joint, a single joint between a first panel 14 and a second panel 18 will primarily be discussed. Other joints in the piece of furniture may be constructed in similar manner. As shown, the crate 10 is assembled from two first panels 14 and two second panels 18.

A first panel 14 is formed with both slots 22 and tabs 26 along an edge of the first panel 14. The slots 22 and tabs 26 are disposed in an alternating pattern along the edge of the first panel 14. The first panel 14 also includes cuts 46 which extend inwardly from the edge of the first panel 14 between adjacent slots 22 and tabs 26 and form a series of fingers 50. Each finger 50 is associated with a slot or tab. The cuts 46 and resulting fingers 50 isolate adjacent slots 22 or tabs 26 from each other somewhat and increase the flexibility of the first panel 14. The cuts 46 and fingers 50 increase the ease with which the first panel 14 is bent out of plane at a slot 22 or tab 26 in order to engage the second panel 18. The length of the slots 46 and the width of the resulting fingers 50 may be altered according to the size of the resulting crate 10 and the material used for the first panel 14 and second panel 18. For common furniture baskets, ¼ inch or ⅜ inch birch plywood is commonly used for the first panel 14 and second panel 18. This works well with fingers 50 which are between about 2 inches and 3 inches wide and between about 4 inches and about 5 inches long. The length of the cuts 46 and fingers 50 are thus between about 1 and about 3 times the width of the fingers. Thicker material may benefit from longer or narrower fingers 50. Thinner material may benefit from wider or shorter fingers 50.

A second panel 18 is also formed with both slots 38 and tabs 42 along an edge of the second panel 18 in an alternating pattern. The second panel 18 also includes cuts 46 which extend inwardly from the edge of the second panel 18 between adjacent slots 38 and tabs 46 and form a series of fingers 50. Each finger 50 is also associated with a slot 38 or tab 42. The cuts 46 isolate adjacent slots 38 or tabs 42 from each other and increase the ease with which the second panel 18 is bent out of plane at a slot 38 or tab 42 while assembling the first panel 14 and second panel 18 into a joint. The length of the cuts 46 and fingers 50 are thus between about 1 and about 3 times the width of the fingers, and often about 2 times the width of the fingers, and are often about 2 times the width of the fingers.

A joint is formed between the first panel 14 and the second panel 18. The first panel 14 and second panel 18 are formed so that a tab 26 on the first panel 14 is disposed adjacent a slot 38 on the second panel 18 and so that a tab 42 on the second panel 18 is disposed adjacent a slot 22 on the first panel 14 while assembling the joint. In the assembled joint, the fingers 50 with the slots 22, 38 are elastically bent outwardly relative to their respective panel and the fingers 50 with the tabs 26, 42 are elastically bent inwardly relative to the adjacent slotted fingers of that panel. The tabs 26, 42 on each panel 14, 18 are placed into the respective slots 22, 38 on the other panel to assemble the joint.

The fingers 50 remain elastically bent inwardly or outwardly in the assembled joint. The fingers 50 with the slots 22, 38 are urged inwardly over the tabs 26, 42 and against the end of the finger 50 by this residual bending. The fingers 50 with the tabs 26, 42 are urged outwardly so that the tabs 26, 42 are urged against the sides of the slots 22, 38 by this residual bending. This places the assembled joint under tension and uses the elastic bending of the fingers 50 to hold the tabs 26, 42 in the slots 22, 38 and remove slop from the joint and from the assembled piece of furniture.

The storage crate 10 also includes a bottom panel 54 (FIG. 2A). The bottom panel 54 is held between the side panels 14, 18 and is secured to the side panels with tabs 58 and slots 62. The bottom panel 54 includes tabs 58 which are placed into slots 62 formed near the bottom of the side panels 14, 18 during assembly of the crate 10. Once all four side panels 14, 18 are assembled together around the bottom panel 54, the bottom panel 54 is held captive between the side panels 14, 18. If desired, all four side panels 14, 18 and all four sides of the bottom panel 54 may have tabs 58 and slots 62. Alternatively, two opposed sides of the bottom panel 54 may have tabs 58 and two opposed side panels 18 may have slots 62 to receive the bottom panel 54. Changing the number of tabs 58 and slots 62 used to secure the bottom panel 54 may change both the strength and ease of assembly of the crate 10.

FIG. 1 illustrates how the fingers 50 may be slightly different sizes to increase the stability of the crate 10. Each finger 50 with a slot 22, 38 is cut slightly wider than the fingers 50 with a tab 26, 42. This offset in the widths of the fingers 50 accommodates the width of the cut 46 between fingers 50, allowing the fingers 50 with slots 22, 38 to contact each other vertically along the corner joint and prevent vertical motion between the two panels 14, 18. If the fingers 50 are located on 3 inch centers and the slot 46 is cut with a ¼ inch router bit, the fingers 50 with slots 22, 38 may be cut 3 inches wide while the fingers 50 with tabs 26, 42 may be cut 2.75 inches wide. Alternately, the fingers 50 with slots 22, 38 may be cut 2.75 inches wide while the fingers 50 with tabs 26, 42 may be cut 3 inches wide. This allows the side edges of alternating fingers 50 on the first panel 14 and second panel 18 to contact each other when the crate 10 is assembled to prevent a side panel 14, 18 from moving vertically relative to the other side panel 14, 18.

FIG. 2A shows a top view of the crate 10. It can be seen how the fingers 50 with the tabs and the slots are flexed inwardly and outwardly to assemble the furniture joint and the resulting furniture crate 10. The fingers 50 with the slots 22, 38 are flexed outwardly while the fingers 50 with the tabs 26, 42 are flexed inwardly. These fingers 50 are bent elastically and remain bent when the joint and resulting furniture crate 10 is in an assembled configuration. Varying the lengths of the fingers 50 may change the degree to which the fingers 50 are bent inwardly or outwardly as discussed with respect to FIG. 3A below.

FIG. 2B shows a front view of the crate 10 and FIG. 2C shows a side view of the crate 10. The slots 22, 38 and tabs 26, 42 on each panel 14, 18 are arranged in an alternating fashion, with one slot and then one tab, etc. The adjoining panel used to form a joint is formed with the complementary array of tabs and slots, with one tab and then one slot, etc. The cuts 46 used to form the fingers 50 may extend into the panels 14, 18 a distance inwardly beyond the tabs 26, 42 and slots 22, 38 to increase the flexibility of the fingers 50. These cuts 46 cause most of the flexing to occur in the fingers 50 and not in the center portion of the panels 14, 18 when assembling the joint and in the assembled joint.

Figure 2D:
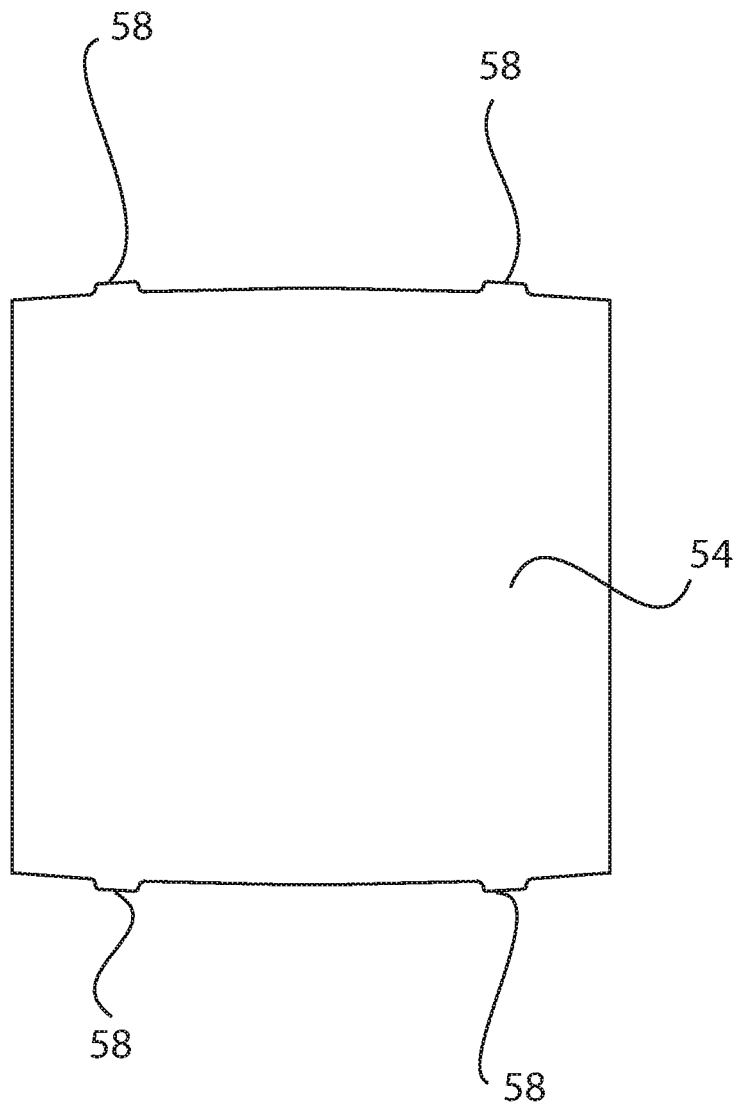
FIG. 2D shows a top view of the bottom panel of the crate of FIG. 1.

FIG. 2D shows a top view of the crate bottom 54. The tabs 58 used to secure the bottom panel 54 between the second panels 18 are more easily seen. Additionally, it can be seen how the edges of the bottom panel 54 may be curved to match the bent shape of the first panel 14 and second panel 18 in the assembled crate 10. Particularly, the two edges of the bottom panel 54 which have the tabs 58 extending therefrom are convex in shape to match the curvature in the bottom of the second panel 18 and the bottom fingers 50 of the second panel in the assembled crate 10.

FIG. 3A shows a front view of the first panel 14 of the crate 10. The tabs 26 and slots 22 are visible on their respective fingers 50. FIG. 3A more clearly shows the shape of the fingers 50 with respect to the slots 22 and tabs 26. A finger 50 with a slot 22 has the slot 22 formed in the finger 50. The example slots 22 extend through the first panel 14 and the tabs 26 are sufficiently long to extend past the surface of the second panel 18. The example second panel 18 is similarly formed. The slot 22 is centered in the finger 50, but could be moved for aesthetic reasons so long as the corresponding tab 42 is also moved accordingly. Additionally, some or all of the fingers 50 could have multiple slots 22, 38 and tabs 26, 42. The shape of the finger 50 outside of the slot 22 is not critical as it extends beyond the plane of intersection of the panels in an assembled joint. As shown, the fingers 50 are cut square beyond the slot 22 so that these side edges terminate near the resulting joint and create a substantially square joint and section of the piece of furniture. If desired, the outer edges of the slot fingers could be rounded or cut in different cosmetic shapes.

A finger 50 with the tab 26 has the tab 26 located along the width of the finger to match the position of the slot 38 (in the second panel 18) which will receive the finger 22. In the example shown, the tab 26 is centered in the finger 50. The distal portion of the finger 50 next to the tab 26 is cut square with the end of the finger 50 forming a shoulder 66 adjacent the tab 26. The face of a slotted finger 50 of the second panel 18 rests against this shoulder 66 in an assembled joint. As shown, the corners between the tab 26 and the shoulder 66 may be undercut somewhat to allow for automated cutting with a cnc router. While the slot 38 could be made longer instead, the undercut corner results in a joint with less slop.

FIG. 3A illustrates how the shoulders 66 formed on the tabbed fingers 50 extends father laterally on the first panel 14 than the inside edges 70 of the slots 22. A line drawn through the shoulders 66 on the tabbed fingers 50 is disposed farther away from the center of the first panel 14 than a line drawn through the inside edges 70 of the slots 22. The other side of the first panel 14, as well as both sides of the second panel 18 are also constructed in this shape. This offset between the shoulders 66 and the inside edges 70 of the slots 22, 38 causes the slotted fingers 50 to flex outwardly and the tabbed fingers 50 to flex inwardly when assembling the furniture joint and to remain flexed in the assembled furniture joint. Increasing the offset between the shoulders 66 and the inside edges 70 of the slots 22, 38 increases the flexing of the fingers 50. The slotted fingers 50 of a first panel 14 are held outwardly by the tabbed fingers of a second panel 18. Similarly, the slotted fingers 50 of the second panel 18 are held outwardly by the tabbed fingers 50 of the first panel 14.

FIG. 3B shows a top view of the first panel 14 of the crate 10 in the flexed position that it would have in an assembled piece of furniture. The first panel 14 remains flexed in this position in an assembled furniture joint. Accordingly, the tabbed fingers 50 are shown bending inward, and the slotted fingers 50 are shown bending outward, as would be the case when the front piece is assembled with the other parts of the crate 10.

FIG. 3A also shows other parts of the crate 10. If desired, hand hold holes 74 may be formed in the first panels 14 as well as in the second panels 18 to provide easy gripping locations for a user. Additionally, the first panels 14 and second panels 18 may be formed with tabs 78 and corresponding recesses 82 which allow the crates 10 to be stacked more easily and securely.

FIG. 4A shows a front view of the second panel 18 of the crate 10. The tabs 42 and slots 38 on their respective fingers 50 are visible. It can be seen how the first panel 14 of the crate 10 shown in FIG. 3A has tabbed fingers on top while the second panel 18 has the corresponding slotted fingers on top. The tabs 42 and slots 38 alternate and the slots 38 on the second panel 18 are placed in complementary locations with respect to the tabs 26 on the first panel 14 and vice versa so that the first panel 14 and second panel 18 fit together in a joint. The second panel 18 has two slots 62 formed along the bottom of the second panel 18. These slots 62 receive the bottom panel 54 of the crate 10 which is formed with corresponding tabs 58. If desired, first panels 14 of the crate 10 may also be formed with slots 62 to receive tabs 58 on the bottom panel 54.

FIG. 4B shows a top view of the second panel 18 of the crate 10. The tabbed fingers 50 are shown bending inward and the slotted fingers 50 are shown bending outward, as would be the case when the second panel 18 is assembled with the other parts of the crate 10.

Figure 5:
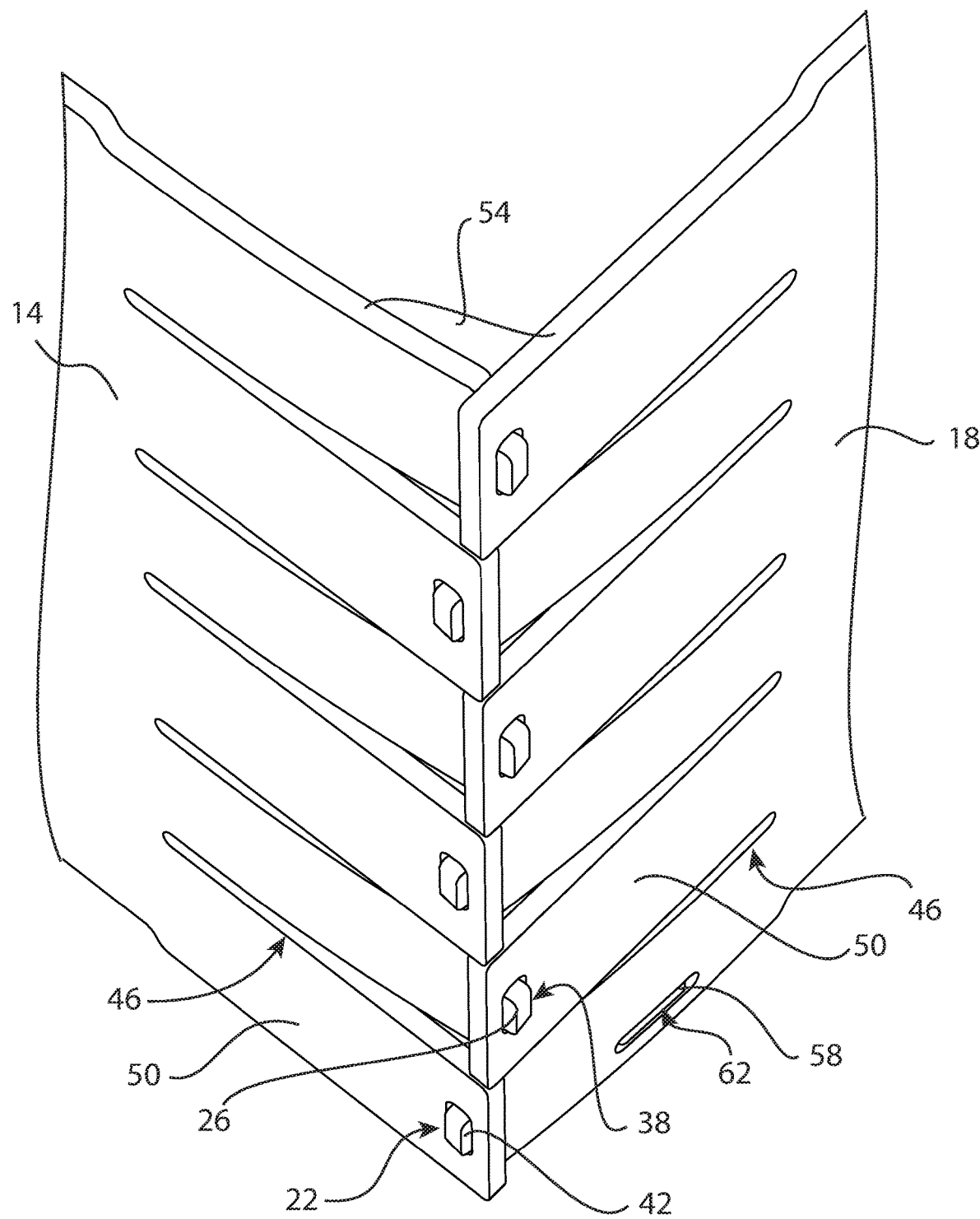
FIG. 5 shows a perspective view of the crate of FIG. 1.

FIG. 5 shows a closer view of the front panel 14 assembled with the side panel 18. Every tabbed finger 50 on the front panel 14 has a corresponding slotted finger 50 on the side panel 18 into which it is able to bend towards and enter. Every tab 42 on the second panel 18 has a corresponding slot 22 on the first panel 14 into which it is able to bend towards and enter. These tabs 26, 42 and slots 22, 38 alternate down the height of the crate 10, creating a woven appearance, and a sturdy joint between the first panel 14 and the second panel 18.

FIG. 5 illustrates how the resulting joint is held together by tension. The second panel 18 is pulled inwardly towards the first panel 14 because its tabbed fingers 50 are bent inwardly and restrained by the front panel slotted fingers 50. The front panel 14 is similarly restrained. The fingers 50 remain elastically bent in an assembled joint. The tension created in the bent fingers 50 keeps the resulting joint from being loose. FIG. 5 also better illustrates how the slotted fingers 50 are cut wider than the tabbed fingers 50. The slotted fingers are cut to fit against each other in the assembled joint and a gap is left between the tabbed fingers 50 due to the cutter width. While not strictly necessary, this offset in width prevents vertical play between the first panel 14 and the second panel 18 in the assembled joint.

Figure 6A:
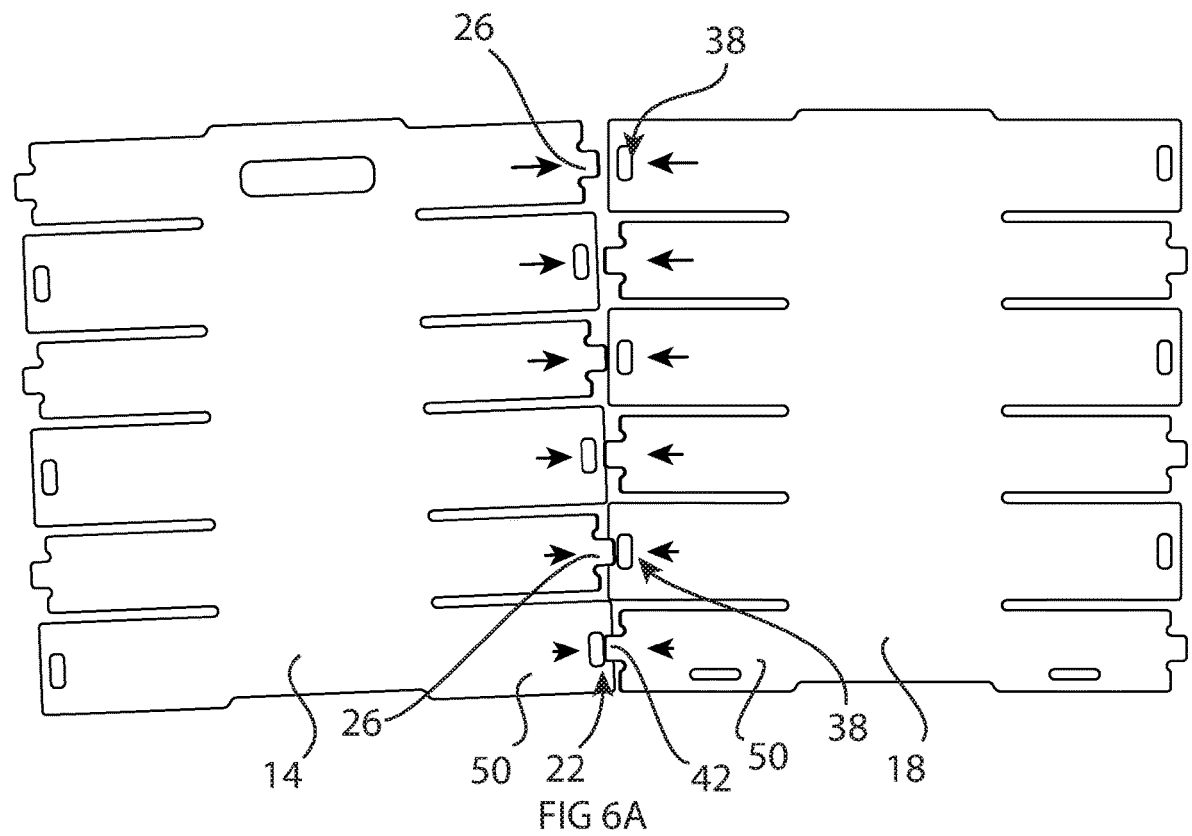
FIG. 6A shows a drawing illustrating assembly of the crate of FIG. 1.
Figure 6B:
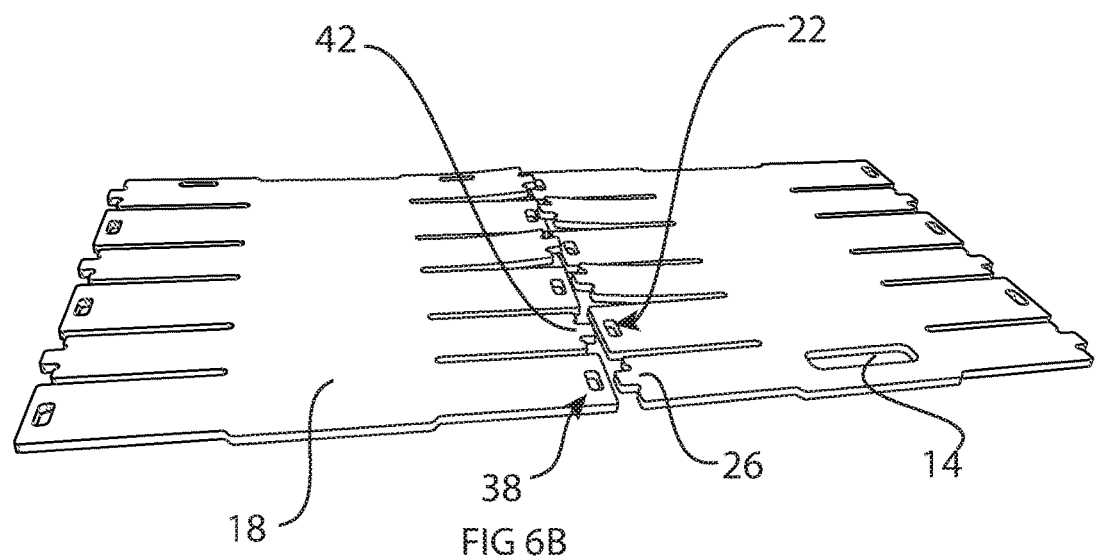
FIG. 6B shows a drawing illustrating assembly of the crate of FIG. 1.

FIG. 6A shows a top view of a first step in assembling the crate 10. A first panel 14 and a second panel 18 are laid side-by-side with the inside faces of the panels facing up, apart at a slight angle. The lowest tab 42 is bent upwardly and laid on top of its corresponding slot 22 on the opposite panel. The two parts are twisted or bent slightly, bringing the next tab 26 upwardly and on top of its corresponding slot 38. This bending process continues until every tab 26, 42 is placed above its respective slot 22, 38. FIG. 6B shows a perspective view of the step shown in FIG. 6A in assembling the crate 10. The tabs 26, 42 are bent and laid on top of their respective slots 22, 38 using the method described in FIG. 6A.

Figure 7:
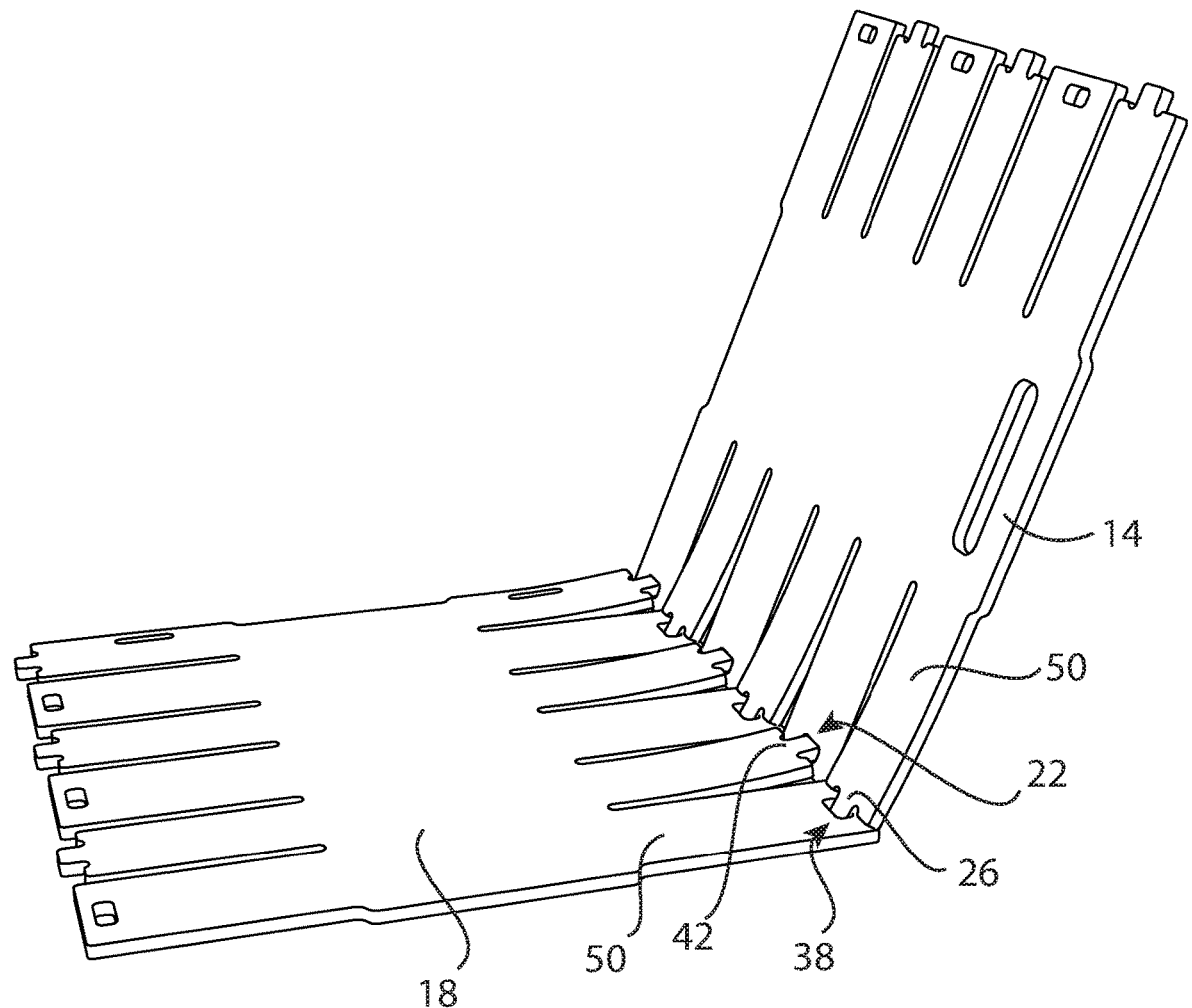
FIG. 7 shows a drawing illustrating assembly of the crate of FIG. 1.

FIG. 7 shows a perspective view of a second step in assembling the crate 10. The first panel 14 and second panel 18 are brought to an angle relative to each other while guiding the tabs 26, 42 to help them slide into the respective slots 22, 38. As the first panel 14 and second panel 18 are brought into the proper angle for the assembled joint, the tabs 26, 42 enter the slots 22, 38 and the shoulders 66 are drawn to the faces of the slotted fingers 50 by the tension exerted by the elastically bend fingers 50. This tension holds the joint together and helps to remove slop from the joint. These assembly steps are repeated for two other joints as another first panel 14 and second panel 18 are assembled together. This results in four panels 14, 18 assembled together with a remaining open corner joint. The bottom panel 54 may then be assembled into the crate by placing the bottom panel tabs 58 into the slots 62.

Figure 8:
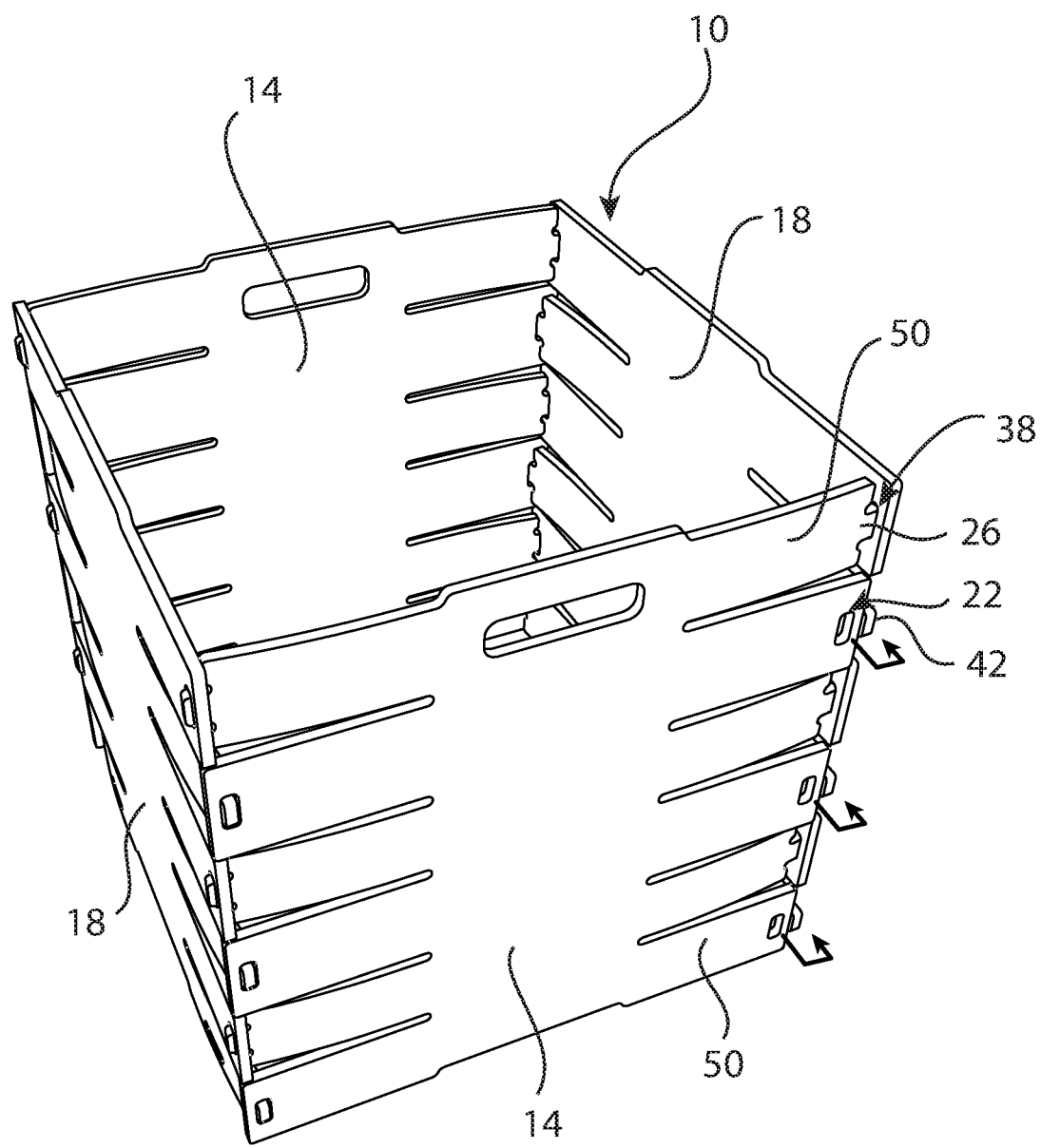
FIG. 8 shows a drawing illustrating assembly of the crate of FIG. 1.

FIG. 8 shows a perspective view of the last step in assembling the crate 10. Four panels 14, 18 have been assembled together using the first and second steps described in FIGS. 6A through 7 above and the bottom panel 54 has been assembled as described. The open ends of the panels 14, 18 for the final corner joint are brought together and the tabs 26 on the first panel 14 are inserted partway into the respective slots 38 on the second panel 18. Then the slotted fingers 50 on the first panel 14 are bent out and the tabbed fingers 50 on the second panel 18 are bent inward so that each tab 42 is inserted into the corresponding slot 22. Once this is complete, the tabs 26 on the first panel 14 are allowed to fully enter the corresponding slots 38 on the second panel 18 and the assembly of the crate 10 is complete.

Figure 9:
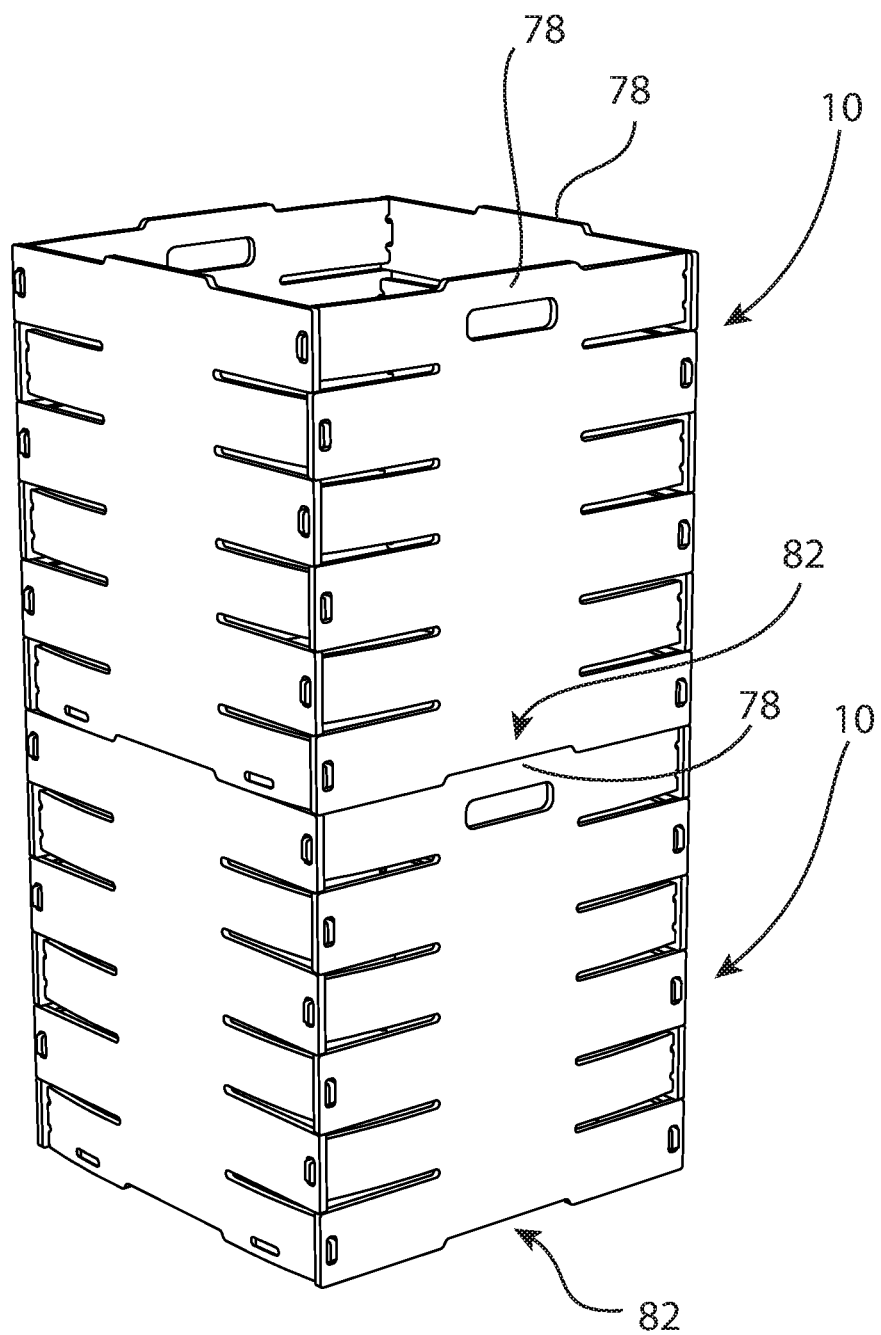
FIG. 9 shows a perspective view of two of the crates of FIG. 1.

FIG. 9 shows a perspective view of two crates 10 stacked on top of each other. If the first panel 14 and second panels 18 of the crate 10 are formed with corresponding tabs 78 extending up from the upper surface and recesses 82 extending into the lower surfaces, a crate 10 and another like crate 10 will nest on top of each other as shown. The tabs 78 on the four sides of the bottom crate 10 engage the recesses 82 on the bottom of the top crate 10 and keep the crates stacked on top of each other.

Figure 10:
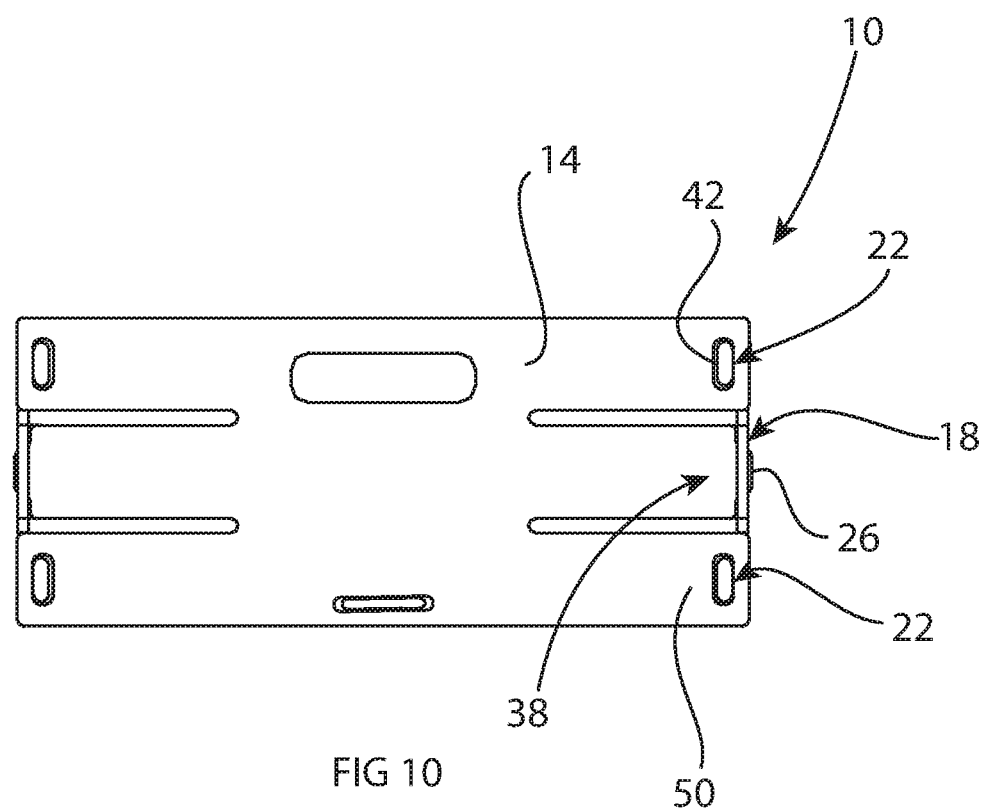
FIG. 10 shows a front view of another crate.
Figure 11:
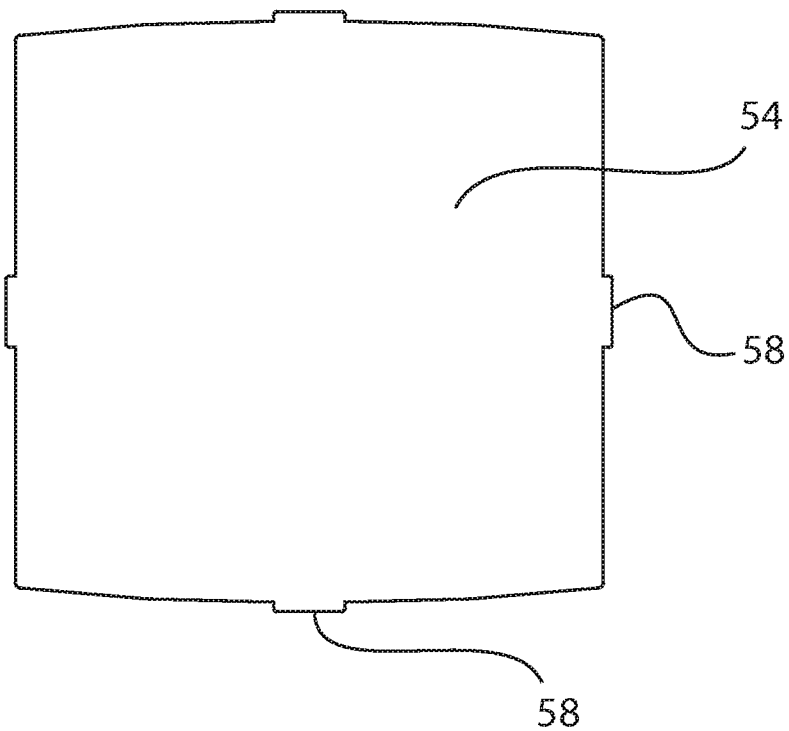
FIG. 11 shows a top view of the bottom of the crate of FIG. 10.

FIG. 10 shows a front view of an alternate crate 10. The crate 10 is shorter than the crate 10 shown previously. Additionally, the first panel 14 and second panel 18 each have three fingers 50. The first panel 14 includes top and bottom fingers 50 with slots 22 and a middle finger with a tab 26. The second panel 18 includes top and bottom fingers with tabs 42 and a middle finger 50 with a slot 38. The crate 10 structure is otherwise the same as is discussed above. This example crate 10 is shown with a bottom panel 54 (FIG. 11) with tabs 58 on all four sides and the first panels 14 and second panels 18 are each formed with a corresponding slot 62.

Figure 12:
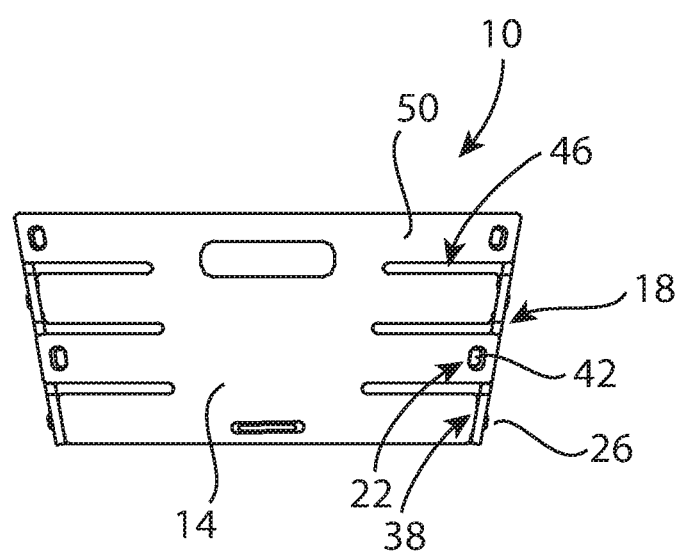
FIG. 12 shows a front view of another crate.

FIG. 12 shows a front view of an alternate crate 10. The crate 10 is formed with angles first panels 14 and second panels 18, resulting in a crate 10 with a larger upper opening and a smaller bottom panel 54. Alternatively, the crate 10 could be made with a smaller upper opening and a larger bottom panel 54. The first panel 14 and second panel 18 are formed by cutting the slots 22, 38 and the edges of the slotted fingers at an angle. The ends of the tabs 26, 42 and the shoulders 66 are also formed at this angle. The ends of the tabs 26, 42, the shoulders 66, the slots 22, 38, and the ends of the slotted fingers are all formed at a desired angle and are parallel to each other. This results in an assembled crate 10 where the first panel 14 and the second panel 18 are angled as shown. The bottom panel 54 (not shown) is similar to that shown in FIG. 11. The crate 10 uses blind slots 62 formed on the inside surfaces of the first panels 14 and second panels 18 in the locations shown above.

Figure 13:
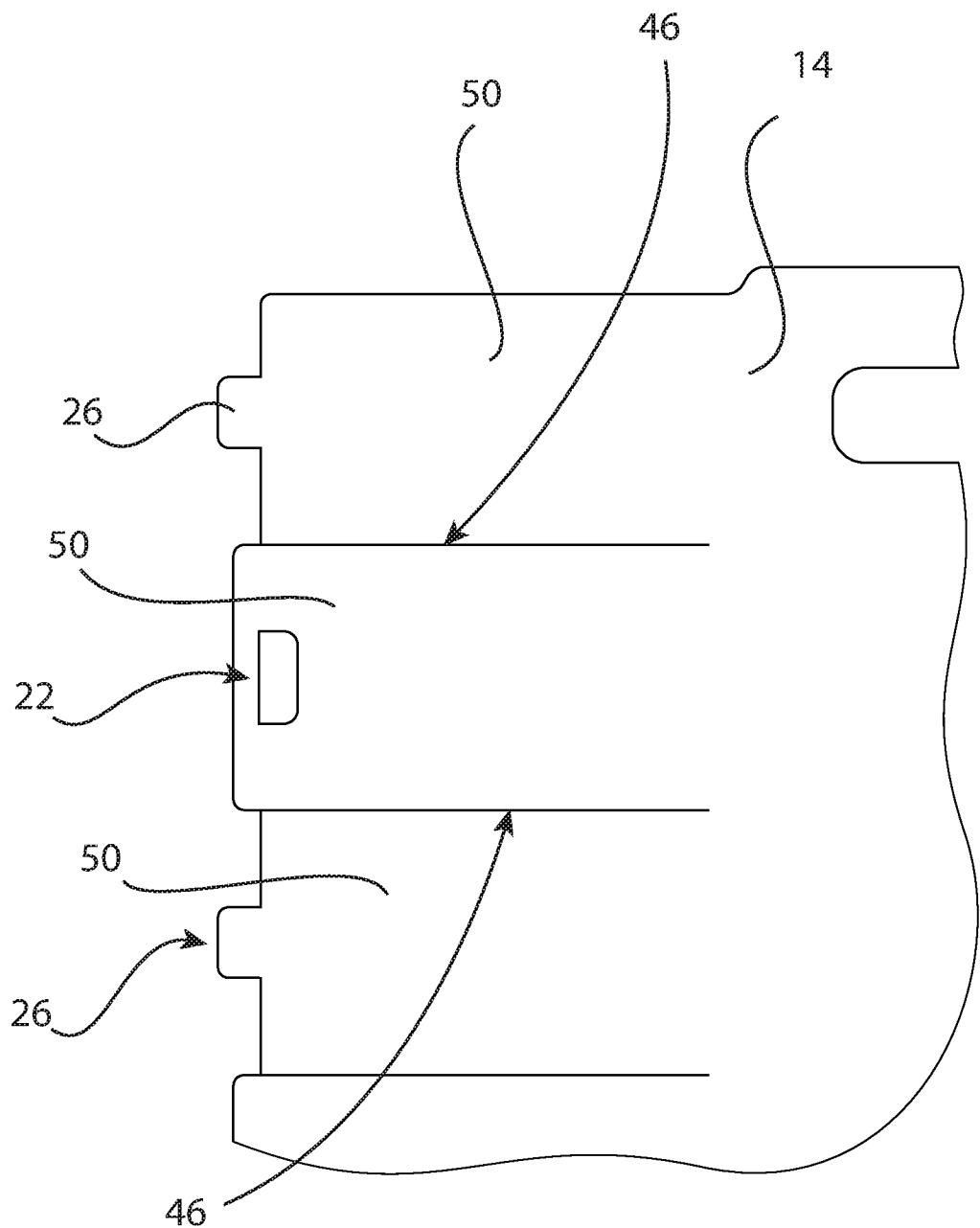
FIG. 13 shows a partial view of the first panel of the crate of FIG. 1.

FIG. 13 shows a front view of a portion of a first panel 14. For clarity, only a small portion of the first panel 14 is shown. The panel has been cut out using a die cutter or a laser cutter, etc. in order to create a cut with minimum width. This allows for fingers 50 which are divided from each other with minimal space in between adjacent fingers 50. The cut 46 between fingers 50 may often be as small as a few hundredths of an inch or less. This changes the aesthetic of the panels and allows for a crate 10 or similar furniture piece without significant gaps between the fingers 50. The first panels 14 and second panels 18 could be made in this manner. Due to the reduced width of the cut 46, the fingers 50 may be the same width or have less difference in width while still allowing alternating fingers from the first panel 14 and second panel 18 to contact each other and prevent movement in the joint as discussed above. The panels 14, 18 otherwise function in the same manner as is discussed above.

In cutting the panels 14, 18, the width of the tabs 26, 42 and the length of the slots 2,2 38 may vary, but tabs 26, 42 which are between about 0.5 and 1.5 inches wide work well for commonly sized furniture crates or baskets. The width of the slots 22, 38 is selected to be slightly greater than the thickness of the panel material to allow the tabs 26, 42 to be inserted easily. As can be seen above, the tabs 26, 42 may be at a small angle when inserted into the slots 22, 38 and having a degree of clearance in the width of the slot 22, 38 will ease insertion of the tab 26, 42. The slot 22, 38 may be between about 0.01 and 0.03 inches wider than the thickness of the panel material. The flexing of the panels 14, 18 and fingers 50 in the assembled joint will remove play from the assembled joint even if the slots 22, 38 have some clearance around the tabs 26, 42. In this manner, the furniture joint is advantageous as it easily accommodates the variation in actual thickness for a panel material of nominal thickness.

The joint can also be used to create a variety of furniture pieces including case goods (bookshelves, dressers, night stands, cabinets) as well as other furniture. For example, a box such as the crate 10 shown may be placed on its side with the top opening facing forwards and a shelf may be placed across the middle of the box parallel to a first panel 14 or a second panel 18 to create a small shelf. This same construction may be used in the orientation shown previously to create a box or basket with a divider panel. The woven finger joint shown herein may thus be used to create aesthetic variation in different items of furniture.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. An item of furniture comprising:
   a first panel comprising:
      a first side;
      a cut which extends into the first panel from the first side to form a first finger and a second finger;
      a first tab formed on an end of the first finger;
      a first slot formed adjacent an end of the second finger;
   a second panel comprising:
      a first side;
      a cut which extends into the second panel from the first side to form a first finger and a second finger;
      a second tab formed on an end of the second panel first finger;
      a second slot formed adjacent an end of the second panel second finger;
   wherein the first panel and the second panel are connected together to form a joint such that:
      the first panel is disposed at an angle to the second panel;
      the first side of the first panel is disposed adjacent the first side of the second panel;
      the first finger and second finger of the first panel are elastically bent;
      the first finger and second finger of the second panel are elastically bent;
      the first tab is disposed in the second slot; and
      the second tab is disposed in the first slot.

2. The item of furniture of claim 1, wherein the first panel is disposed generally perpendicular to the second panel.

3. The item of furniture of claim 1, wherein the first panel first finger comprise a first shoulder formed on an end thereof adjacent the first tab, wherein the first shoulder is disposed adjacent a face of the second panel first finger, wherein the second panel second finger comprise a second shoulder formed on an end thereof adjacent the second tab, and wherein the second shoulder is disposed adjacent a face of the first panel second finger.

4. The item of furniture of claim 1, wherein the first panel comprises at least three fingers with alternating tabs and slots on the fingers, and wherein the second panel comprises at least three fingers with alternating slots and tabs on the fingers, wherein tabs on the first panel are placed in corresponding slots on the second panel, and wherein tabs on the second panel are placed in corresponding slots on the first panel.

5. The item of furniture of claim 1, wherein the first panel first finger comprise a first shoulder formed on an end thereof adjacent the first tab, wherein a line along the first shoulder is parallel to a line along an inside edge of the first slot, wherein the first shoulder is disposed farther from a center of the first panel than the line along the inside edge of the first slot, wherein the second panel second finger comprise a second shoulder formed on an end thereof adjacent the second tab, wherein a line along the second shoulder is parallel to a linen along an inside edge of the second slot, and wherein the second shoulder is disposed farther from a center of the second panel than the line along the inside edge of the second slot.

6. The item of furniture of claim 1, wherein the first panel second finger is wider than the first panel first finger, wherein the second panel first finger is wider than the second panel second finger, wherein a side edge of the first panel second finger contacts a side edge of the second panel first finger, and wherein a side edge of the first panel first finger does not contact a side edge of the second panel second finger.

7. The item of furniture of claim 1, wherein a length of each of the fingers is between about 1 times and about 3 times a width of each of the fingers.

8. The item of furniture of claim 1, wherein the first panel and the second panel form sides of a furniture box, and wherein a third panel is connected to the first panel and is connected to the second panel and is disposed generally perpendicular to the first panel and generally perpendicular to the second panel.

9. An item of furniture comprising:
   a first panel comprising:
      a first side having a first finger and a second finger extending therefrom;
      a first tab formed on an end of the first finger;
      a first slot formed adjacent an end of the second finger;
   a second panel comprising:
      a first side having a first finger and a second finger extending therefrom;
      a second slot formed on an end of the second panel first finger;
      a second slot formed adjacent an end of the second panel second finger;
   wherein the first panel and the second panel are connected together to form a joint such that:
      the first side of the first panel is disposed adjacent the first side of the second panel;
      at least one of the first finger and the second finger of the first panel is elastically bent;
      at least one of the first finger and second finger of the second panel is elastically bent;
      the first tab is disposed in the second slot; and
      the second tab is disposed in the first slot.

10. The item of furniture of claim 9, wherein the first panel is disposed at an angle to the second panel.

11. The item of furniture of claim 9, wherein the first panel comprises a cut which extends into the first panel from the first side to form the first finger and the second finger, and wherein the second panel comprises a cut which extends into the second panel from the first side to form the first finger and the second finger.

12. The item of furniture of claim 9, wherein the first panel is disposed generally perpendicular to the second panel.

13. The item of furniture of claim 9, wherein the first panel first finger comprise a first shoulder formed on an end thereof adjacent the first tab, wherein the first shoulder is disposed adjacent a face of the second panel first finger, wherein the second panel second finger comprise a second shoulder formed on an end thereof adjacent the second tab, and wherein the second shoulder is disposed adjacent a face of the first panel second finger.

14. The item of furniture of claim 9, wherein the first panel comprises at least three fingers with alternating tabs and slots on the fingers, and wherein the second panel comprises at least three fingers with alternating slots and tabs on the fingers, wherein tabs on the first panel are placed in corresponding slots on the second panel, and wherein tabs on the second panel are placed in corresponding slots on the first panel.

15. The item of furniture of claim 9, wherein the first panel first finger comprise a first shoulder formed on an end thereof adjacent the first tab, wherein a line along the first shoulder is parallel to a line along an inside edge of the first slot, wherein the first shoulder is disposed farther from a center of the first panel than the line along the inside edge of the first slot, wherein the second panel second finger comprise a second shoulder formed on an end thereof adjacent the second tab, wherein a line along the second shoulder is parallel to a linen along an inside edge of the second slot, and wherein the second shoulder is disposed farther from a center of the second panel than the line along the inside edge of the second slot.

16. The item of furniture of claim 9, wherein the first panel second finger is wider than the first panel first finger, wherein the second panel first finger is wider than the second panel second finger, wherein a side edge of the first panel second finger contacts a side edge of the second panel first finger, and wherein a side edge of the first panel first finger does not contact a side edge of the second panel second finger.

17. The item of furniture of claim 9, wherein a length of each of the fingers is between about 1 times and about 3 times a width of each of the fingers.

18. The item of furniture of claim 9, wherein the first panel and the second panel form sides of a furniture box, and wherein a third panel is connected to the first panel and is connected to the second panel and is disposed generally perpendicular to the first panel and generally perpendicular to the second panel.

\* \* \* \* \*